（12）United States Patent
Reus

(10) Patent No.: US 10,252,752 B2
(45) Date of Patent: Apr. 9, 2019

(54) SPLASH-PROTECTION DEVICE FOR A WHEEL-MOUNTED VEHICLE, AND ASSEMBLY HAVING SUCH DEVICE

(71) Applicant: R-PI, Fontenay-le-Comte (FR)

(72) Inventor: Pierre Reus, Nantes (FR)

(73) Assignee: R-PI, Fontenay-le-Comte (FR)

( * ) Notice: Subject to any disclaimer, the term of this patent is extended or adjusted under 35 U.S.C. 154(b) by 0 days.

(21) Appl. No.: 15/571,264

(22) PCT Filed: May 2, 2016

(86) PCT No.: PCT/FR2016/051024
§ 371 (c)(1),
(2) Date: Nov. 2, 2017

(87) PCT Pub. No.: WO2016/177957
PCT Pub. Date: Nov. 10, 2016

(65) Prior Publication Data
US 2018/0273113 A1    Sep. 27, 2018

(30) Foreign Application Priority Data

May 4, 2015   (FR) .................................... 15 53988

(51) Int. Cl.
*B62D 25/18*   (2006.01)
(52) U.S. Cl.
CPC ......... *B62D 25/182* (2013.01); *B62D 25/188* (2013.01)
(58) Field of Classification Search
CPC ..... B62D 25/18; B62D 25/188; B62D 25/182
See application file for complete search history.

(56) References Cited

U.S. PATENT DOCUMENTS 4,928,994 A * 5/1990 Buchner .............. B62D 25/188
280/851
5,582,431 A * 12/1996 Anderson ............ B62D 25/188
280/851
(Continued)

FOREIGN PATENT DOCUMENTS

DE      102010053463      6/2012
EP         1040985        10/2000
(Continued)

OTHER PUBLICATIONS

International Search Report dated Aug. 19, 2016.
International Search Report dated Mar. 8, 2016.

*Primary Examiner* — Bryan A Evans
(74) *Attorney, Agent, or Firm* — Ipsilon USA, LLP

(57) ABSTRACT

A spray protection device (1) for a wheeled vehicle (20) having at least one wheel (21) standing on the ground, said device (1) comprising a spray shield (2), suitable for being arranged at least in part behind the wheel (21), and connection means (3) for connecting the shield (1) to said vehicle (20), the spray shield (2) presenting a face suitable for facing towards the wheel (21) to be protected and an opposite face, referred to as the "back" of the shield (2), the connection means (3) for connecting the shield (2) to the vehicle (20) being configured, when the shield (2) is coupled to the vehicle (20), to enable the shield (2) to move between a high position, at a distance from the ground, and a low position, close to the ground.
The device (1) comprises resilient shield (2) return means in the high position and a surface carried by the shield (2) and suitable for being exposed to the airflow generated when the wheeled vehicle (20) is moving forwards, said surface being configured, under the action of said airflow, to enable the shield (2) to move in a direction that is opposite to the direction of the return force.

10 Claims, 6 Drawing Sheets

(56) References Cited

U.S. PATENT DOCUMENTS

| | | | | |
|---|---|---|---|---|
| 6,565,122 B1* | 5/2003 | Hansen | ............... | B62D 25/188 |
| | | | | 280/851 |
| 7,708,315 B1* | 5/2010 | Dumitrascu | ......... | B62D 25/188 |
| | | | | 280/848 |
| 2004/0164539 A1 | 8/2004 | Bernard | | |
| 2009/0289446 A1 | 11/2009 | Proctor | | |
| 2013/0285358 A1 | 10/2013 | Lasser | | |
| 2015/0014975 A1 | 1/2015 | Atkinson | | |
| 2015/0014976 A1* | 1/2015 | Atkinson | ............ | B62D 25/182 |
| | | | | 280/848 |

FOREIGN PATENT DOCUMENTS

| | | |
|---|---|---|
| JP | 2006315566 | 11/2006 |
| JP | 2014084035 | 5/2014 |

\* cited by examiner

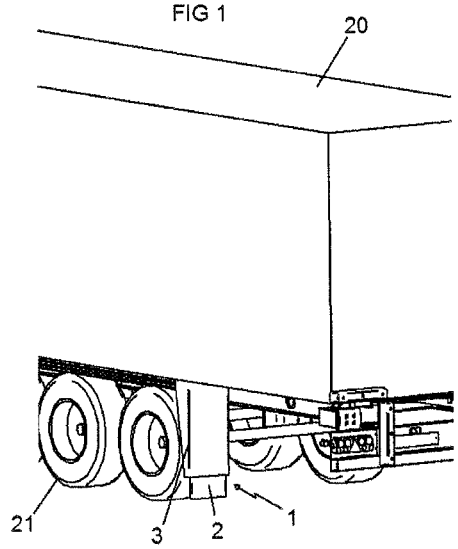
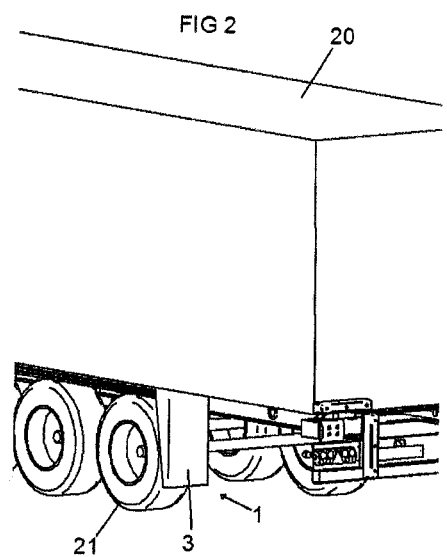

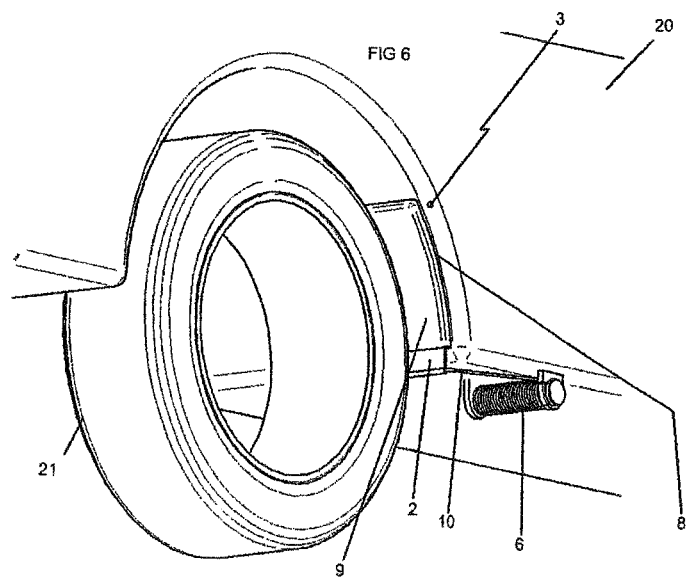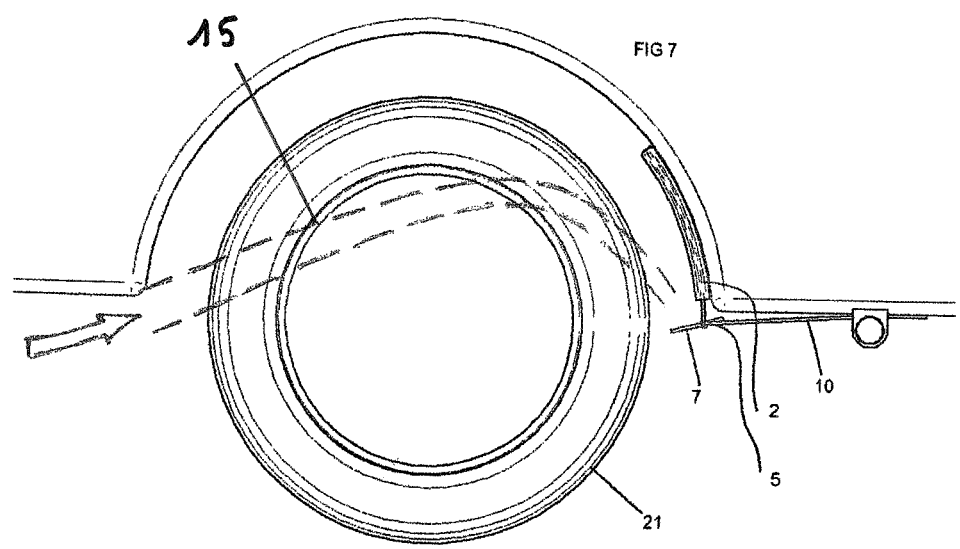

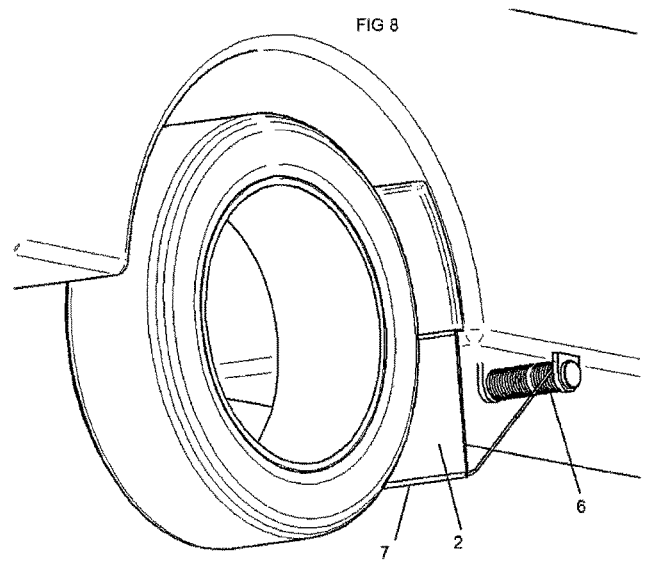
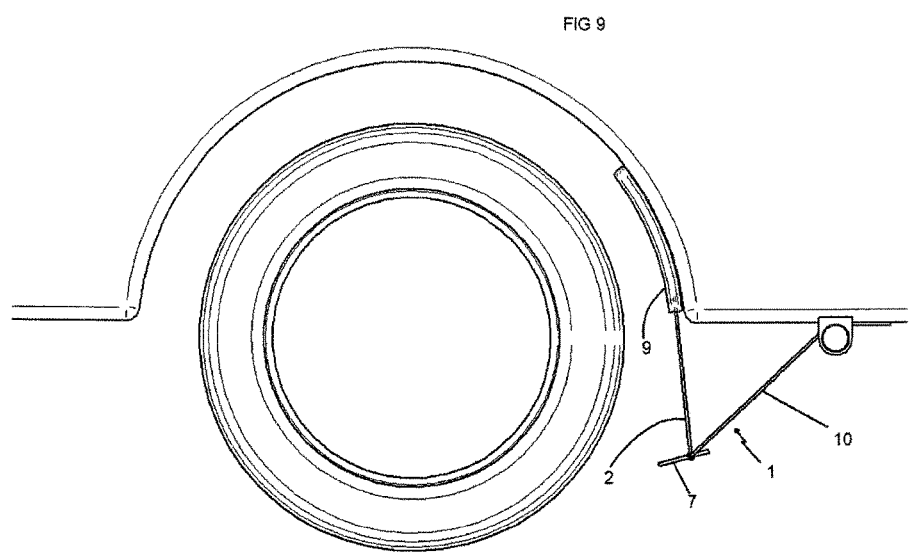

SPLASH-PROTECTION DEVICE FOR A WHEEL-MOUNTED VEHICLE, AND ASSEMBLY HAVING SUCH DEVICE

RELATED APPLICATION

This application is a National Phase of PCT/FR2016/051024, filed on May 2, 2016 which in turn claims the benefit of priority from French Patent Application No. 15 53988, filed on May 4, 2016, the entirety of which are incorporated by reference.

FIELD OF THE INVENTION

The invention relates to a spray protection device for a wheeled vehicle, and to an assembly comprising a wheeled vehicle fitted with such a device.

More particularly, the invention relates to a protection device comprising a spray shield, suitable for being arranged at least in part behind the wheel, and connection means for connecting the shield to said vehicle, the spray shield presenting a face suitable for facing towards the wheel to be protected and an opposite face, referred to as the "back" of the shield, and the means for connecting the shield to the vehicle being configured, when the shield is coupled to the vehicle, to enable the shield to move between two positions: one, referred to as the "high" position, at a distance from the ground; and the other, referred to as the "low" position, close to the ground.

PRIOR ART

Such a protection device is known from document JP 2006 315566.

For many years, spray, at the rear of a vehicle, caused by the vehicle driving on a wet road has been a source of accidents. The presence of a flap or mudguard arranged around at least part of the wheel(s), at least the wheels at the rear of said vehicle, makes it possible to reduce the quantity of spray. However, in particular for trailers or semi-trailers of trucks, those flaps or mudguards must be at a sufficient distance from the ground in order to avoid damaging said flaps or mudguards, in particular during loading or unloading operations in a bay. As a result, the bottom free edge of the flap or mudguard is generally relatively far from the ground, leaving free a substantial spray angle. Those same constraints apply to light vehicles, in particular when parking.

OBJECTS AND SUMMARY

An object of the present invention is thus to propose a spray protection device for a wheeled vehicle, and an assembly comprising the wheeled vehicle fitted with such a device, of design that reduces the quantity of spray produced at the rear of the vehicle, particularly when said vehicle is traveling at high speed.

To this end, the invention aims to provide a spray protection device for a wheeled vehicle, having at least one wheel standing on the ground, the device comprising a spray shield, suitable for being arranged at least in part behind the wheel, and connection means for connecting the shield to said vehicle, the spray shield presenting a face suitable for facing towards the wheel to be protected and an opposite face, referred to as the "back" of the shield, and the means for connecting the shield to the vehicle being configured, when the shield is coupled to the vehicle, to enable the shield to move between two positions: one, referred to as the "high" position, at a distance from the ground; and the other, referred to as the "low" position, close to the ground, the device being characterized in that it comprises firstly, resilient shield return means that can be interposed between the shield and the vehicle and/or the means for connecting the shield to the vehicle and that are suitable for enabling the shield to be returned to the high position, and secondly, a surface carried by the shield and suitable for being exposed to the airflow generated when the wheeled vehicle is moving forwards, said surface being configured, under the action of said airflow, to enable the shield to move in a direction that is opposite to the direction of the return force.

By means of the presence of a configured surface, i.e. a surface that is shaped and oriented so that the airflow resulting from the forward movement of the vehicle that hits said surface is suitable for generating a movement of the shield against the return means, the shield lowers when the speed of the vehicle is sufficiently high, when such lowering of the shield prevents a portion of the spray produced by the wheel of the vehicle from being projected behind the vehicle, which would risk inconveniencing a following wheeled vehicle.

In an embodiment of the invention, the connection means comprise guide means for guiding sliding movement of the shield.

In an embodiment of the invention, the connection means comprise an apron of the plate type, and in that the means for guiding sliding movement of the shield are configured to enable the shield to move up and down along the apron when the apron is in the vertically-positioned state for passage of said shield from a high position in which the shield and the apron cover each other at least in part to a low position in which the shield projects from the bottom transverse edge of the apron in order to increase the working area of said apron. By way of example, these guide means are thus configured to enable the shield to pass from a high position in which the back of the shield is hidden by said apron covering the back of the shield, and a low position in which it projects from the bottom transverse edge of the apron in order to increase the working area of said apron.

In an embodiment of the invention, the connection means comprise guide means for guiding pivoting movement of the shield.

In an embodiment of the invention, the surface is made integrally with said shield.

In a variant, the surface is made as a separate part fitted on said shield.

In an embodiment of the invention, when said shield is in a vertical position it presents two "vertical" longitudinal edges, and the surface is mounted off-center and extends beyond one of said edges. Said off-centering of the surface makes it possible for said surface to take advantage of the airflow generated by the forward movement of the vehicle and to limit the influence on said surface of turbulence resulting from the presence of wheels.

In an embodiment of the invention, the device includes locking means for locking the shield in the high position and data acquisition means for acquiring data representative of rain, said locking means being means that are unlockable and configured to pass from the locked position to the unlocked position as a function of data provided by the data acquisition means.

The presence of these locking means makes it possible to use the shield only in the event of a road that is likely to be wet.

In an embodiment, the protection device includes air guide means suitable for guiding at least a portion of the airflow generated during forward movement of the vehicle towards the surface carried by the shield.

In an embodiment, the guide means comprise at least one duct and/or a deflector suitable for being fastened to said vehicle.

The invention also provides an assembly comprising a wheeled vehicle having at least one wheel standing on the ground and a spray protection device suitable for being associated with said wheel to protect it from spray resulting from rotation of the wheel on the ground, the device comprising a spray protection shield and connection means for connecting the shield to said vehicle, said shield being suitable for being arranged at least in part at the rear of the wheel, said spray protection shield presenting a face suitable for facing towards the wheel to be protected and an opposite face referred to as the "back" of the shield, the assembly being characterized in that the protection device is of the above-mentioned type, the means for connecting the shield to the vehicle are configured, when the shield is coupled to the vehicle, to enable the shield to move between two positions: one, referred to as the "high" position, at a distance from the ground; and the other, referred to as the "low" position, close to the ground, and in that the device comprises firstly, resilient shield return means that can be interposed between the shield and the vehicle and/or the means for connecting the shield to the vehicle and that are suitable for enabling the shield to be returned to the high position, and secondly, a surface carried by the shield and suitable for being exposed to the airflow generated when the wheeled vehicle is moving forwards, said surface being configured, under the action of said airflow, to enable the shield to move in a direction that is opposite to the direction of the return force.

Preferably, when the vehicle is in a position standing on the ground on a horizontal surface, the surface carried by the shield forms a surface that slopes relative to the ground plane on which the vehicle is standing, from a front low point of the vehicle towards a rear high point of the vehicle.

BRIEF DESCRIPTION OF THE DRAWINGS

The invention can be well understood on reading the following description of embodiments given with reference to the accompanying drawings, in which:

FIG. 1 is a fragmentary view in perspective of a vehicle fitted with a device of the invention, with the shield in the low position.

FIG. 2 is a fragmentary view in perspective of a vehicle fitted with a device of the invention, with the shield in the high position.

FIGS. 6 and 7, in the form of fragmentary side views in perspective, show a vehicle fitted with a device of the invention, with the shield in the high position.

FIGS. 8 and 9, in the form of fragmentary side views in perspective, show a vehicle fitted with a device of the invention, with the shield in the low position.

DETAILED DESCRIPTION

Figure 3A:
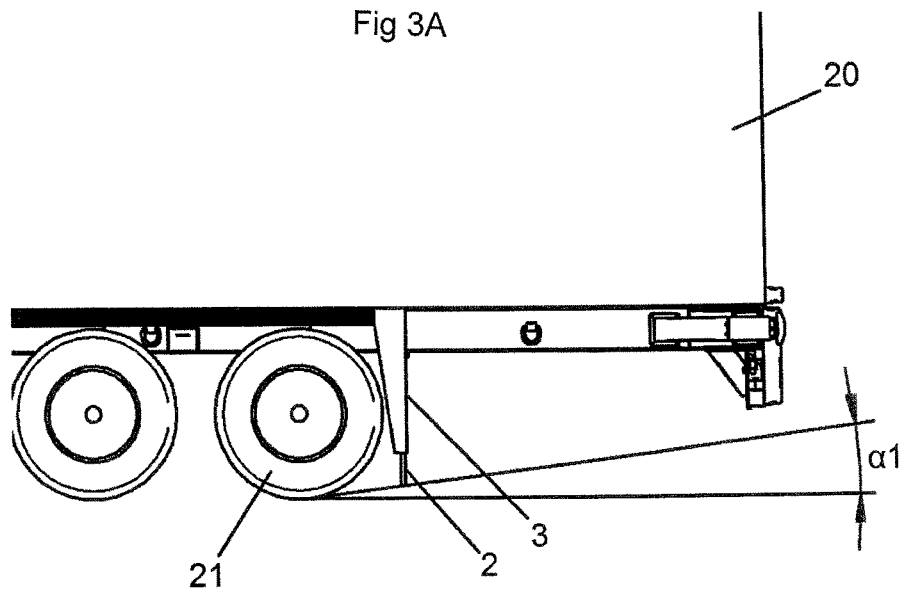
FIGS. 3A and 3B are side views of the vehicle of FIGS. 1 and 2, with respective spray cones formed.

As mentioned above, the spray protection device 1 of the invention is more particularly designed to be fitted to a wheeled vehicle 20 having at least one wheel 21 standing on the ground. This wheeled vehicle 20 may thus for example be a motorbike, a car, or, as in the example shown, a truck, such as a semi-trailer truck.

In this embodiment, the protection device 1 is shown associated with the wheel 21 of the vehicle 20 standing on the ground, arranged as far back as possible on the vehicle 20, in order to avoid spray resulting from rotation of the wheel being projected from the rear of the vehicle 20.

This device comprises a spray protection shield 2 suitable for being arranged at least in part behind the wheel 21. In this embodiment, said shield 2 is present in the form of a plate, with one face 4 facing towards the wheel 21 to be protected, and an opposite face forming the back 5 of the shield.

The protection device 1 further comprises connection means 3 for connecting the shield 2 to the vehicle. These means 3 for connecting the shield 2 to the vehicle are configured to enable the shield 2 to move between two positions, one referred to as a "high" position, at a distance from the ground, when the shield 2 is coupled to the vehicle 20, the other referred to as a low position, close to the ground, when the shield 2 is coupled to the vehicle 20.

These connection means 3 may have a great number of forms.

In the example shown in FIGS. 1 to 5, the connection means 3 comprise an apron 9 in the form of a plate. The apron 9 carries guide means 8 for guiding sliding movement of the shield 2. Said guide means 8 are in the form of two substantially parallel slides fastened along the "longitudinal" edges of the apron, with said longitudinal edges of the apron 9 extending vertically when the apron 9 is fastened to the vehicle. The apron 9 may constitute a first spray-protection element. It is therefore positioned vertically behind the wheel and is held in this position by means for fastening it to the bodywork of the vehicle. It therefore presents, in similar manner to the shield, one face facing towards the wheel to be protected, and an opposite face forming the back of the apron.

In this embodiment, the shield 2 extends between the apron 9 and the wheel 21. This shield 2 is fitted with rotary members, such as wheels or rollers, that are inserted in slides carried by the apron 9, in order to facilitate the sliding movement of the shield 2 along said apron 9. The shield 2 can thus be moved up and down along the apron 9 and is suitable for passing from the high position in which the back of the shield is covered at least in part by said apron covering the back of the shield, to the low position in which it projects from the bottom transverse edge of the apron in order to increase the working area of said apron. In the high position, the back of the shield may be covered entirely or in part by said apron.

The device 1 further comprises resilient return means 6 for returning the shield 2 to the high position. These return means 6 are present in the form of a helical spring arranged between the top edge of the shield 2 and the top edge of the apron 9. In equivalent manner, the return means 6 could extend between the top edge of the shield 2 and the bodywork of the vehicle.

Finally, the device includes a surface 7 carried by the shield and suitable for being exposed to the airflow generated during forward movement of the wheeled vehicle 20. Under the action of said airflow, this surface 7 is configured to enable the shield 2 to move in a direction that is opposite to the direction of the return force.

In the example shown, said shield 2 presents in a vertical position two "vertical" longitudinal edges 11 and two "horizontal" transverse edges 12. The surface 7 is mounted off-center and extends beyond one of said longitudinal edges 11, and the surface 7 is made in the form of a separate part fitted on said shield 2. In a variant, this surface 7 could be made integrally with said shield 2.

When the vehicle is in a position standing on the ground on a horizontal surface, the surface 7 carried by the shield 2 forms a surface that slopes relative to the ground plane on which the vehicle 20 is standing, from a front low point of the vehicle 20 to a rear high point of the vehicle 20.

Thus, the surface 7 is suitable, when forward movement of the vehicle is being driven at a speed that is sufficiently high relative to the rating or stiffness of the spring, for driving the shield 2 downwards, i.e. against the action of the return means 6.

Figure 3B:
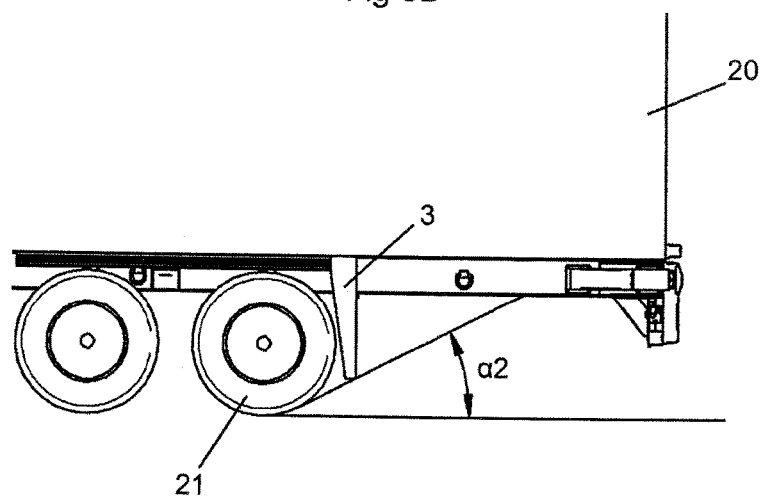
Figure 4:
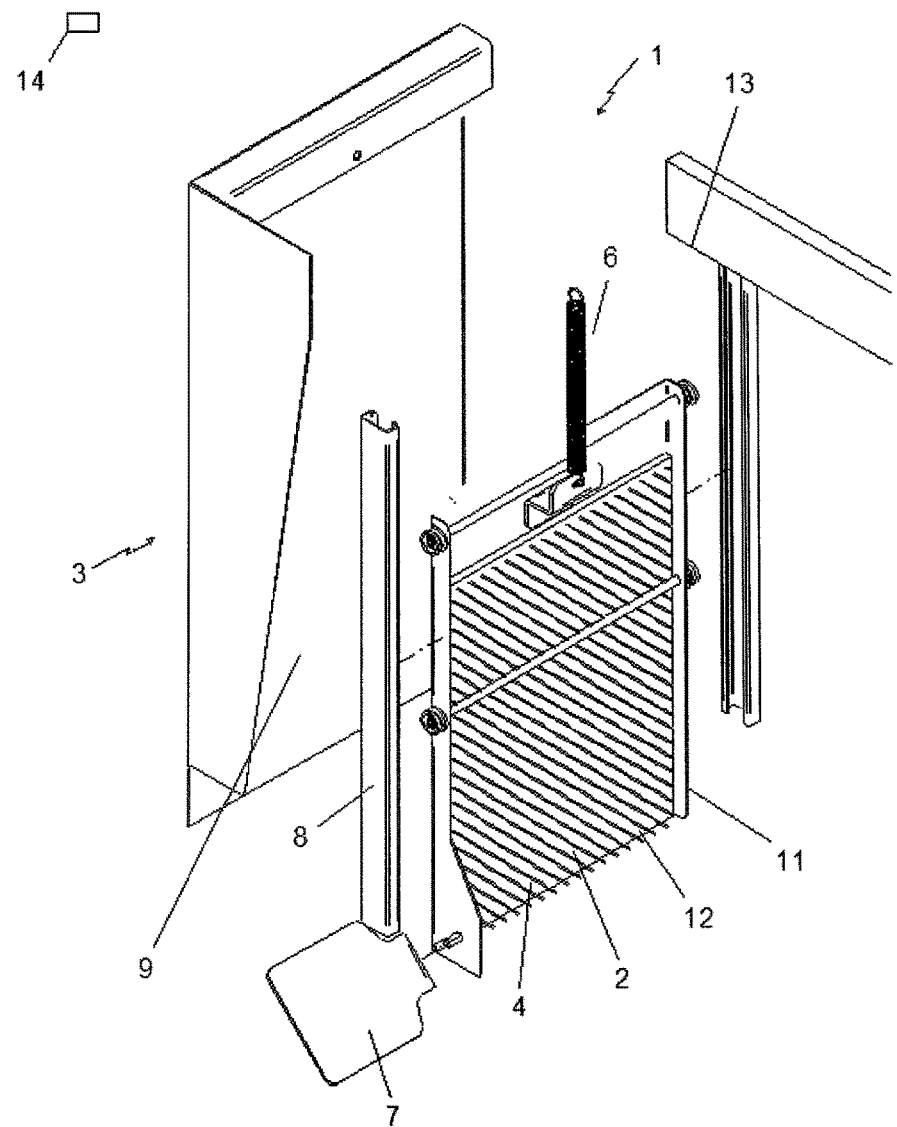
FIG. 4 is an exploded view of the elements constituting a device of the invention.

In the low position, the shield 2 enables the spray cone of the wheel 21 to be reduced, as shown in FIGS. 3A and 3B where FIG. 3A shows the shield 2 in the low position with a cone angle of value $\alpha 1$ that is less than the spray cone of FIG. 3B of angle $\alpha 2$, the shield being, in FIG. 3B, in the high position.

In order to limit the descent of the shield, the slides can be closed at their bottom ends and thus form, at said closed ends, an end stop of the shield 2.

Figure 5:
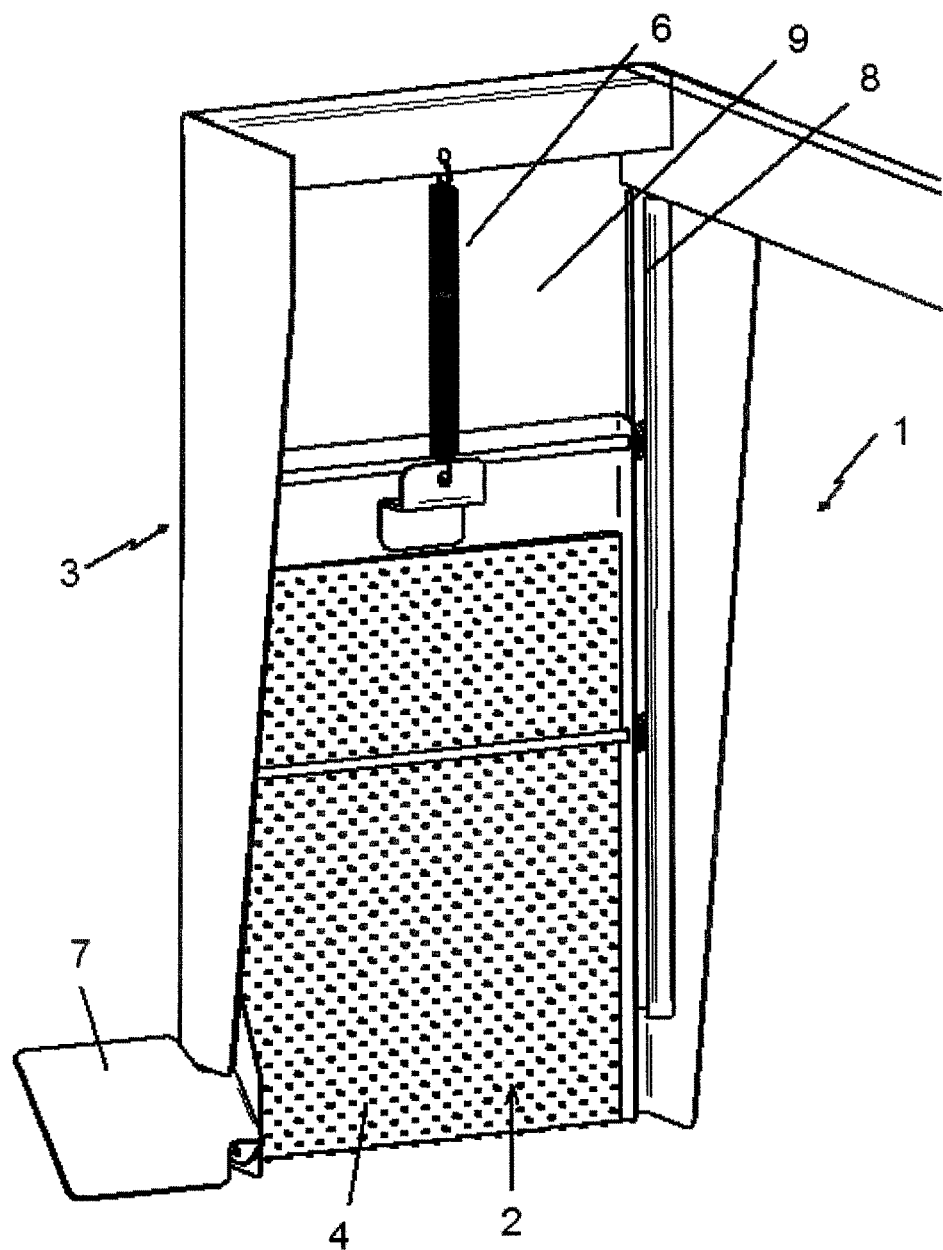
FIG. 5 is a view of the FIG. 4 device in the assembled state.

In the example shown in FIG. 5, the shield 2 further includes spikes on its face 4 facing towards the wheel, which spikes make it possible to guide the flow of water projected by the wheel onto said face 4 of the shield 2. Thus, when the vehicle is stationary, the shield 2 is in the high position. As soon as the vehicle is moving at a sufficiently high speed, the shield 2 descends until it eventually reaches a low end position, at a predetermined speed of advance of the vehicle.

In addition, in the example shown in FIG. 7, the protection device includes air guide means 15 suitable for guiding at least a portion of the airflow generated during forward movement of the vehicle towards the surface 7 carried by the shield. These guide means make it possible to avoid the need to optimize the position of the surface 7 carried by the shield in the high position of the shield. Relative to the airflow generated during forward movement of the wheeled vehicle, it can be complicated to optimize the position of the surface 7 both in the high position and in the low position of the shield. These guide means make it possible to overcome this difficulty. These guide means 15 may have a great number of forms. In FIG. 7, they are formed by a single through duct fastened to the wheeled vehicle 20 and extending from the front towards the rear of the wheel 21 of the vehicle that stands on the ground in order to open out at its free "rear" facing the surface 7 carried by the shield. These guide means could also be made in the form of a baffle plate.

In order to improve the assembly, the device includes locking means 13 for locking the shield 2 in the high position and data acquisition means 14 for acquiring data representative of rain, said locking means 13 being means that are unlockable and configured to pass from the locked position to the unlocked position as a function of data provided by the data acquisition means 14.

These locking means 13 may be formed by a single electromagnet that is secured to the bodywork of the vehicle or to the connection means 3 for connecting the device to the vehicle, and to a metal portion of the shield. The data acquisition means 14 for acquiring data representative of rain may be formed by a rain sensor, means for detecting actuation of the windscreen wipers, or other means. At least a portion of the means 14 for acquiring data representative of rain may be pre-fitted on the vehicle. In this event, the locking means should be connected to the pre-existing data acquisition means.

As soon as data representative of rain is supplied, the electromagnet stops being powered and the shield is free to pass from the high position to the low position, as a function of the speed of advance of the vehicle moving forwards. Thus, use of the shield 2 is avoided when it is not necessary.

In the example shown in FIGS. 6 to 9, the return means 6 are presented in the form of a torsion spring wound around a pivot axis connecting the spring to the bottom of the edge of the bodywork of the vehicle. The parallel branches of the spring are coupled to the shield at the transverse edge 12 below the shield 2.

Additionally, said shield 2 is housed in such a manner that it can be moved by sliding inside a casing fastened to the bodywork of the vehicle, at the wheel housing of said vehicle. Said casing is a thin casing of the bushing type, positioned behind the wheel. The casing has a face that faces towards the wheel and an opposite face, fastened to the bodywork, that defines the wheel housing. The casing is open towards the ground, in order to enable the shield to be inserted therein in such a manner that it can be moved by sliding. In a manner similar to that described above, the shield 2 is fitted with a surface 7 suitable for being exposed to the airflow generated during forward movement of the vehicle. The torsion spring therefore tends to return the shield to the high position, i.e. into the casing, whereas the surface 7 carried by the shield 2, when co-operating with the airflow, tends to drive the shield downwards towards an outlet of the casing.

In parallel with its return function, the spring thus forms means guiding pivoting movement of said shield for the portion of the shield situated outside the casing. This shield 2 is made in the form of a flexible plate, due to the arcuate shape of the casing.

As mentioned above, regardless of the embodiment, the protection device operates as follows: when the vehicle is stationary or advancing at a speed that is less than a first predetermined value that is a function of the force exerted by the return means on the shield, the shield is in the high position. As soon as the speed of advance of the vehicle exceeds said first predetermined value, the shield tends to move down. The downward movement may continue as the speed of advance of the vehicle increases, until the shield reaches an end stop corresponding to a second predetermined speed of advance value of the vehicle. As soon as the vehicle slows down and its speed falls below the second predetermined speed of advance value of the vehicle, the shield moves upwards, returning to the starting high position when the vehicle is stationary or the speed of advance of the vehicle is less than a first predetermined speed value. If the device is fitted with means for locking the shield in the high position, the shield is moved only if the shield has been released beforehand.

The invention claimed is:

1. A spray protection device for a wheeled vehicle, having at least one wheel standing on the ground, the device comprising:
    a spray shield, suitable for being arranged at least in part behind the wheel, and connection means for connecting the shield to said vehicle, the spray shield presenting a face suitable for facing towards the wheel to be protected and an opposite back face of the shield; the means for connecting the shield to the vehicle being configured, when the shield is coupled to the vehicle, to enable the shield to move between two positions: a high position, at a distance from the ground; and the other, a low position, close to the ground, wherein said device has resilient shield return means that can be interposed between the shield and the vehicle and/or the connection means for connecting the shield to the vehicle and that are suitable for enabling the shield to be returned to the high position, a surface carried by the shield and suitable for being exposed to the airflow generated when the wheeled vehicle is moving forwards, said surface being configured, under the action of said airflow, to enable the shield to move in a direction that is opposite to the direction of the return force, and air guide means suitable for guiding at least a portion of the airflow generated during forward movement of the vehicle towards the surface carried by the shield, wherein the air guide means comprise at least one duct and/or a deflector suitable for being fastened to said vehicle.

2. A protection device according to claim 1, wherein the connection means comprise means for guiding sliding movement of the shield.

3. A protection device according to claim 2, wherein the connection means comprise an apron of the plate type, and in that the means for guiding sliding movement of the shield are configured to enable the shield to move up and down along the apron when the apron is in the vertically-positioned state for passage of said shield from a high position in which the shield and the apron cover each other at least in part to a low position in which the shield projects from the bottom transverse edge of the apron in order to increase the working area of said apron.

4. A protection device according to claim 1, wherein the connection means comprise means for guiding pivoting movement of the shield.

5. A protection device according to claim 1, wherein the surface is made integrally with said shield.

6. A protection device according to claim 1, wherein the surface is made as a separate part fitted on said shield.

7. A protection device according to claim 1, wherein when said shield is in a vertical position it presents two vertical longitudinal edges, and the surface is mounted off-center and extends beyond one of said edges.

8. A protection device according to claim 1, wherein said device includes locking means for locking the shield in the high position and data acquisition means for acquiring data representative of rain, said locking means being means that are unlockable and configured to pass from the locked position to the unlocked position as a function of data provided by the data acquisition means.

9. An assembly of the type comprising a wheeled vehicle having at least one wheel standing on the ground and a spray protection device suitable for being associated with said wheel to protect it from spray resulting from rotation of the wheel on the ground, the device comprising:

a spray protection shield and connection means for connecting the shield to said vehicle, said shield being suitable for being arranged at least in part at the rear of the wheel, said spray protection shield presenting a face suitable for facing towards the wheel to be protected and an opposite face referred to as the "back" of the shield; wherein the assembly further comprises the protection device according to claim 1, the means for connecting the shield to the vehicle are configured, when the shield is coupled to the vehicle, to enable the shield to move between two positions: a high position, at a distance from the ground; and the other a low position, close to the ground, and in that the device comprises firstly, resilient shield return means that can be interposed between the shield and the vehicle and/or the means for connecting the shield to the vehicle, and that are suitable for enabling the shield to be returned to the high position, and secondly, a surface carried by the shield and suitable for being exposed to the airflow generated when the wheeled vehicle is moving forwards, said surface being configured, under the action of said airflow, to enable the shield to move in a direction that is opposite to the direction of the return force.

10. An assembly according to claim 9, wherein, when the vehicle is in a position standing on the ground on a horizontal surface, the surface carried by the shield forms a surface that slopes relative to the ground plane on which the vehicle is standing, from a front low point of the vehicle towards a rear high point of the vehicle.

* * * * *